United States Patent
Liu et al.

(10) Patent No.: US 11,849,437 B1
(45) Date of Patent: *Dec. 19, 2023

(54) MANAGEMENT OF CARRIERS TO HELP ENSURE QOS FOR SINGLE-CARRIER UES

(71) Applicant: Sprint Spectrum L.P., Overland Park, KS (US)

(72) Inventors: Chunmei Liu, Great Falls, VA (US); Pratik Kothari, Sterling, VA (US); Hemanth B. Pawar, Brambleton, VA (US); Krishna Sitaram, Chantilly, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/206,092

(22) Filed: Mar. 18, 2021

Related U.S. Application Data

(63) Continuation of application No. 14/844,502, filed on Sep. 3, 2015, now Pat. No. 10,986,634.

(51) Int. Cl.
| | |
|---|---|
| H04W 72/0453 | (2023.01) |
| H04W 76/28 | (2018.01) |
| H04W 28/02 | (2009.01) |
| H04W 72/54 | (2023.01) |
| H04W 88/02 | (2009.01) |
| H04W 88/08 | (2009.01) |

(52) U.S. Cl.
CPC ... *H04W 72/0453* (2013.01); *H04W 28/0268* (2013.01); *H04W 72/54* (2023.01); *H04W 76/28* (2018.02); *H04W 88/02* (2013.01); *H04W 88/08* (2013.01)

(58) Field of Classification Search
CPC ......... H04W 72/0453; H04W 28/0268; H04W 72/1226; H04W 76/28; H04W 88/02; H04W 88/08
USPC ........................................................ 370/281
See application file for complete search history.

(56) References Cited

U.S. PATENT DOCUMENTS

| | | | |
|---|---|---|---|
| 2004/0029579 A1 | 2/2004 | Kashiwase | |
| 2010/0220615 A1 | 9/2010 | Enstrom et al. | |
| 2010/0296473 A1 | 11/2010 | Kim et al. | |
| 2011/0026475 A1* | 2/2011 | Lee | H04L 5/0098 370/349 |
| 2011/0212693 A1 | 9/2011 | Sågfors et al. | |
| 2012/0004010 A1* | 1/2012 | Tamura | H04W 36/30 455/525 |

(Continued)

*Primary Examiner* — Huy D Vu
*Assistant Examiner* — Nizam U Ahmed
(74) *Attorney, Agent, or Firm* — Lee & Hayes, P.C.

(57) ABSTRACT

Disclosed are methods and systems to facilitate management of carriers to help ensure QoS for single-carrier UEs. In particular, a base station may serve one or more first user equipment devices (UEs) on just a first carrier. While doing so, the base station may determine that each of the one or more first UEs being served on just the first carrier is receiving threshold low quality of service from the base station on the first carrier. Responsive to this determining, the base station may (i) select one or more second UEs based on the one or more second UEs being served by the base station on both the first carrier and one or more other carriers and (ii) discontinue serving each selected second UE on the first carrier while continuing to serve each selected second UE on one or more other carriers.

20 Claims, 3 Drawing Sheets

(56) References Cited

U.S. PATENT DOCUMENTS

| | | |
|---|---|---|
| 2012/0157143 A1* | 6/2012 | Tsunekawa .......... H04L 5/0058 455/509 |
| 2012/0182879 A1 | 7/2012 | Tamura et al. |
| 2014/0029586 A1 | 1/2014 | Loehr et al. |
| 2015/0282036 A1 | 10/2015 | Yi et al. |
| 2015/0334733 A1 | 11/2015 | Ren et al. |
| 2016/0050587 A1 | 2/2016 | Lam et al. |
| 2017/0034709 A1 | 2/2017 | Hapsari et al. |

\* cited by examiner

MANAGEMENT OF CARRIERS TO HELP ENSURE QOS FOR SINGLE-CARRIER UES

REFERENCE TO RELATED APPLICATION

This is a continuation of U.S. patent application Ser. No. 14/844,502, filed Sep. 3, 2015, the entirety of which is hereby incorporated by reference.

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the recent version of the LTE standard, for instance, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. The air interface is then divided over time into a continuum of 10-millisecond frames, with each frame being further divided into ten 1-millisecond subframes or transmission time intervals (TTIs) that are in turn each divided into two 0.5-millisecond segments. And each 0.5 millisecond segment or in each 1 millisecond TTI, the air interface is then considered to define a number of 12-subcarrier wide "resource blocks" cooperatively spanning the frequency bandwidth (i.e., as many as would fit in the given frequency bandwidth). In addition, each resource block is divided over time into symbol segments of 67 µs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet. Each such bearer, for instance, may include a radio-link portion extending between the UE and the base station, and an access-network portion extending between the base station and a gateway or switch that provides connectivity with the transport network.

With this arrangement, the UE may operate in a "connected" mode in which the base station may schedule data communication to and from the UE on the UE's established bearer(s). In particular, when the UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. Moreover, LTE also supports uplink control signaling on the PUCCH using uplink control information (UCI) messages. UCI messages can carry scheduling requests from UEs, requesting the base station to allocate PUSCH resource blocks for uplink bearer data communication.

In another arrangement, a revision of LTE known as LTE-Advanced may permit a base station to serve a UE with "carrier aggregation," by which the base station schedules bearer communication with a UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When carriers are aggregated, each carrier may be referred to as a component carrier. Of the component carriers, one may be deemed a primary component carrier or primary cell (PCell) on which the base station serves the UE, and each other component carrier may be deemed to be a secondary component carrier or secondary cell (SCell) on which the base station serves the UE. In particular, the primary carrier may be the carrier on which the UE is attached with the serving base station and may thus carry control signaling (such as scheduling requests and DCI messages) between the base station and the UE, in addition to carrying scheduled data transmissions between the base station and the UE. Each added secondary carrier may then function to increase the total bandwidth on which the base station serves the UE with scheduled data transmissions.

OVERVIEW

In an example wireless communication system, a base station may have a radio-link layer connection respectively with each of a plurality of UEs and may thus serve each such UE over its respective radio-link layer connection. When serving UEs in this manner, the base station's radio-link layer connection with some of the UEs (hereafter "first UEs") may encompass just a single first carrier. Whereas, the base station's radio-link layer connection with other UEs (hereafter "second UEs") may encompass this same first carrier as well as one or more other carriers. This may specifically involve the base station serving each such second UE with carrier aggregation service using the first carrier and one or more other carriers.

When the base station serves the first UEs, at least some of these first UEs may sometimes receive a relatively poor Quality of Service (QoS) on the first carrier. For example, each such first UE may receive on the first carrier a QoS level that is below a threshold QoS level (e.g., established via manual engineering input). When a first UE receives such a relatively poor QoS, this relatively poor QoS may lead to delays in communications between the first UE and the base station and/or may lead to interruptions to such communications, among other undesirable outcomes.

In practice, to increase the QoS level for each first UE that receives the relatively poor QoS, the base station may perhaps provide additional network resources (e.g., resource blocks) to each such first UE. For example, the base station may establish carrier aggregation service for each first UE that receives the relatively poor QoS on the first carrier, so as to provide additional carriers with which to serve each such first UE. Providing additional network resources to each first UE in this manner may allow the base station to then communicate with each first UE on these additional network resources while also allowing the base station to stop communicating with each first UE on at least some of the network resources of the first carrier, thereby potentially increasing the QoS level that each such first UE receives on the first carrier. Unfortunately, however, this approach may still not be ideal because each such first UE may only temporarily receive a relatively poor QoS on the first carrier and may thus not necessarily need the additional carriers after such a first UE no longer receives the relatively poor QoS on the first carrier. As a result, providing additional carriers in this manner may lead to unnecessary consumption of network resources, among other undesirable outcomes.

Disclosed herein is an arrangement to help overcome problems resulting from first UEs that receive a relatively poor QoS on the first carrier and to do so without necessarily having to provide additional carriers to such first UEs. In accordance with the disclosure, the base station may serve one or more first UEs on just the first carrier and, while doing so, the base station may determine that each of the one or more first UEs being served on just the first carrier is receiving threshold low QoS from the base station on the first carrier, such as by receiving a QoS level that is below the above-mentioned threshold QoS level. Once the base station determines that each of the one or more first UEs being served on just the first carrier is receiving threshold low QoS from the base station on the first carrier, the base station may responsively select one or more second UEs due to the one or more second UEs being served by the base station on both the first carrier and one or more other carriers. Then, after selecting one or more second UEs, the base station may discontinue serving each selected second UE on the first carrier while continuing to serve each selected second UE on one or more other carriers.

With this approach, the base station may discontinue scheduling and engaging in communications with each selected second UE on the first carrier, which may ultimately free up network resources on the first carrier. The base station may then use these network resources on the first carrier to schedule and engage in communications with the one or more first UEs, which may increase the QoS level that each of the one or more first UEs receives from the base station on the first carrier. Moreover, since the base station also serves each selected second UE with one or more other carriers, the base station may still continue providing service to each selected second UE, such as by continuing to schedule and engage in communications with each selected second UE on one or more other carriers. In this manner, the base station may solve problems resulting from first UEs that receive a relatively poor QoS on the first carrier and may do so without necessarily having to provide additional carriers to such first UEs.

Accordingly, disclosed herein is a method that involves a base station serving one or more first UEs on just a first carrier. The method also involves the base station determining that each of the one or more first UEs being served on just the first carrier is receiving threshold low quality of service from the base station on the first carrier. Responsive to the determining, the method then involves the base station (i) selecting by the base station one or more second UEs based on the one or more second UEs being served by the base station on both the first carrier and one or more other carriers and (ii) discontinuing by the base station serving each selected second UE on the first carrier while continuing to serve each selected second UE on one or more other carriers.

Further, disclosed herein is a wireless communication system including a base station and a controller configured to cause the base station to perform operations. These operations may involve serving one or more first UEs on just a first carrier frequency. Also, these operations may involve determining that each of the first UEs being served on just the first carrier frequency is receiving threshold low quality of service from the base station on the first carrier frequency. Additionally, these operations may involve, responsive to the determining, (i) selecting one or more second UEs based on the one or more second UEs being served by the base station on both the first carrier frequency and one or more other carrier frequencies and (ii) discontinuing serving of each selected second UE on the first carrier frequency while continuing to serve each selected second UE on one or more other carrier frequencies.

Yet further, in another respect, disclosed is a non-transitory computer-readable medium having stored thereon instructions executable by a processor to cause a wireless communication system to carry out functions such as those noted above, to facilitate management of carriers to help ensure QoS for single-carrier UEs.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
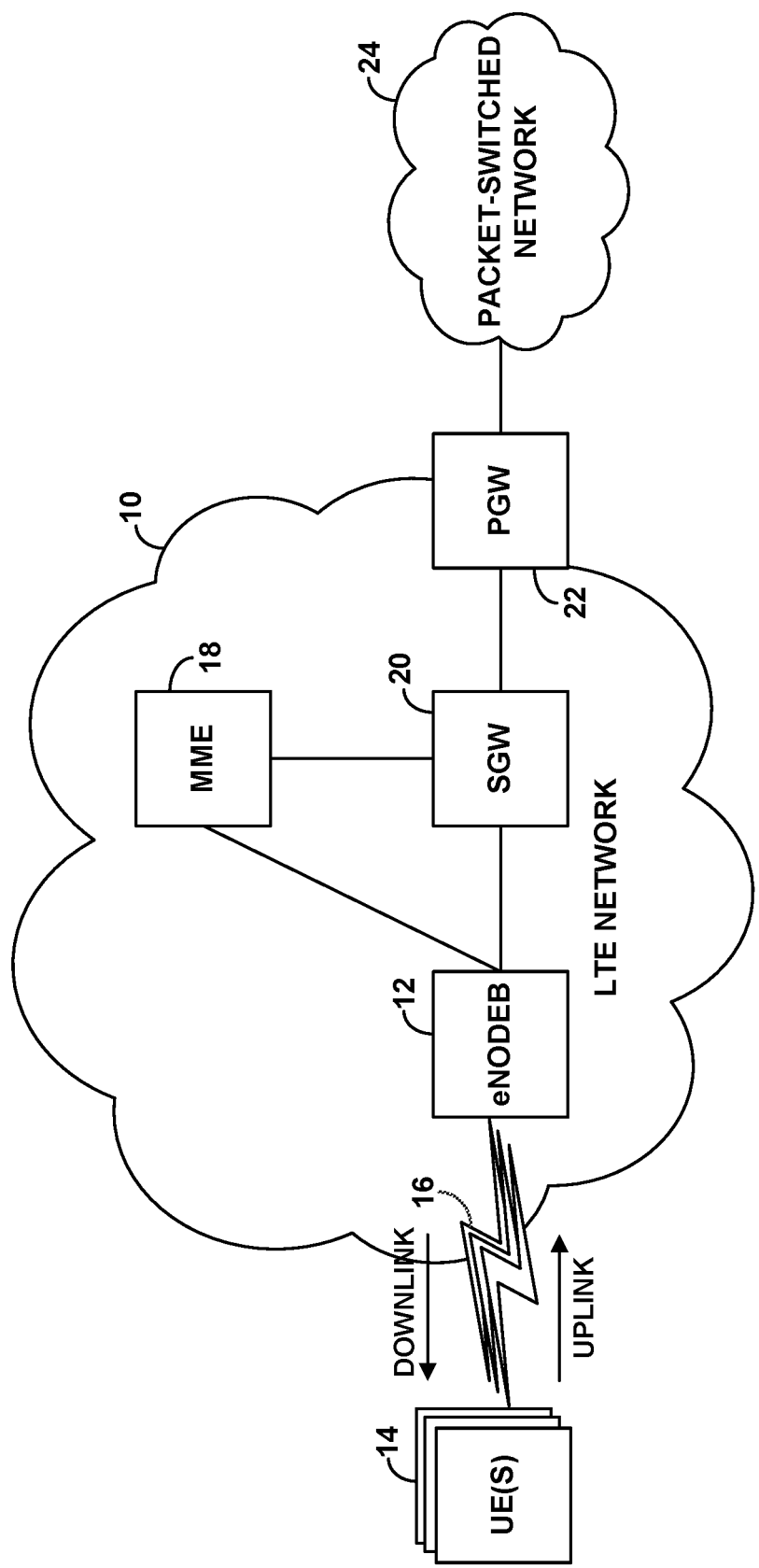
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station 12 known as an eNodeB, which has an antenna structure and associated equipment for providing an LTE coverage area in which to serve one or more UEs 14. More specifically, the eNodeB 12 radiates to define one or more wireless air interfaces 16 through which the eNodeB 12 may respectively communicate with one or more served UEs 14 via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMES, such as MME 18, as well as one or more gateways such as SGW 20 and PGW 22.

Figure 2:
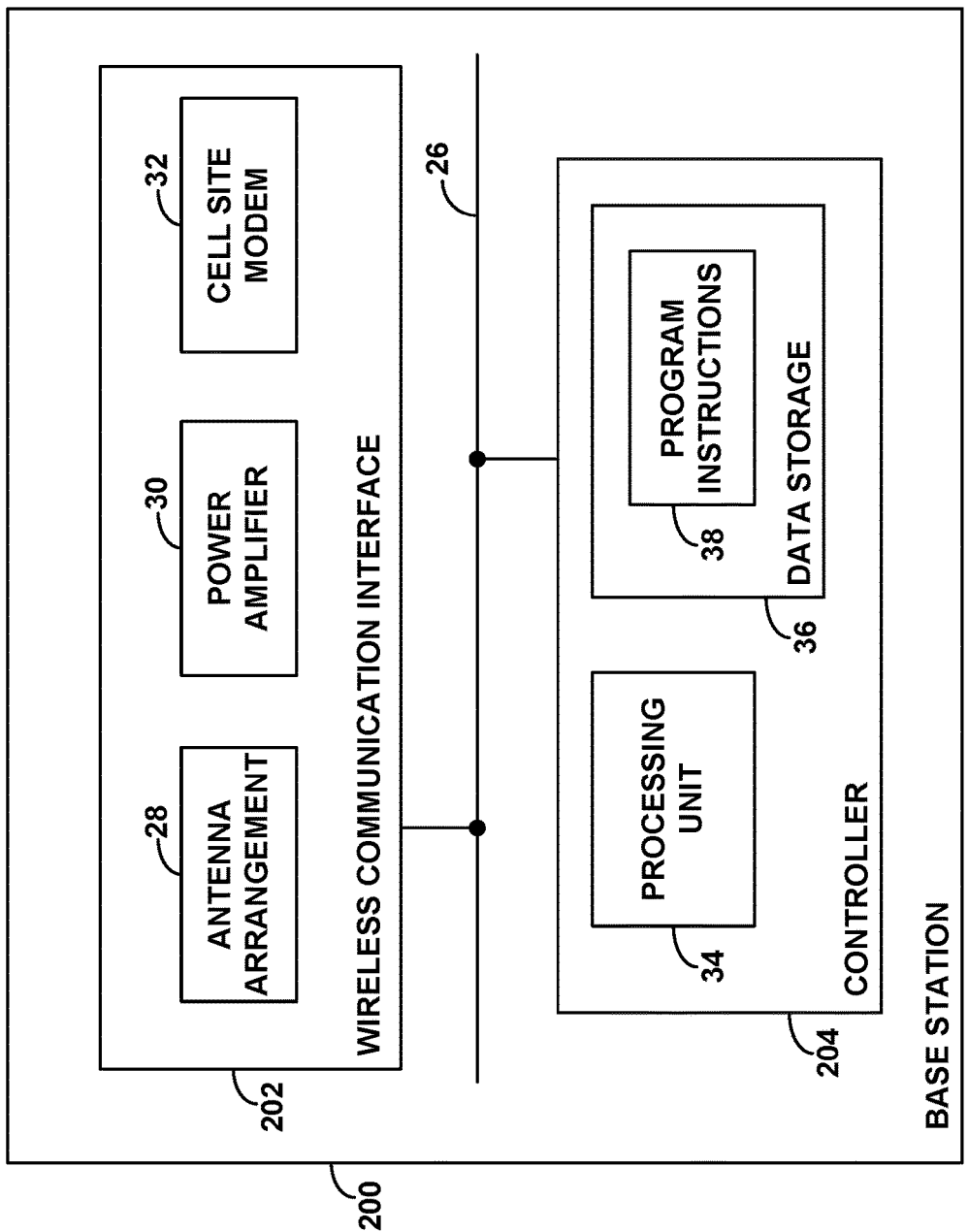
FIG. 2 is a simplified block diagram of a base station in which the present method can be implemented.

FIG. 2 is next a simplified block diagram of a representative base station 200 such as eNodeB 12, illustrating some of the components that can be included in such an entity. As shown in FIG. 2, the representative base station 200 may include a wireless communication interface 202 and a controller 204. Additionally, these components of the base station 200 may be communicatively linked together by a system bus, network, or other connection mechanism 26. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

As noted above, the present disclosure provides for a process that is used to facilitate management of carriers to help ensure QoS for single-carrier UEs. This process could be carried out by eNodeB 12 itself and/or by one or more other network entities, such as with portions of the analysis carried out by an entity outside of the eNodeB 12 (e.g., MME 18) and the eNodeB 12 then responsively working to manage carriers. For simplicity, however, the process will be described here in a scenario where the eNodeB 12 carries out all aspects of the process.

Referring again to FIG. 1, we may assume by way of example (and without limitation) that one or more UEs 14 are each attached with eNodeB 12 and are thus each being served with wireless communication service by eNodeB 12. As such, we may assume that each UE 14 has worked with eNodeB 12 to establish a Radio Resource Control (RRC) connection defining a respective radio-link layer connection between a respective UE 14 and the eNodeB 12, and that at least one logical bearer has been established between the respective UE 14 and the PGW 22, with the bearer including a radio portion extending between the respective UE 14 and the eNodeB 12 and an access-network portion extending between the eNodeB 12 and the PGW 22 via the SGW 20.

Further, we may also assume that the eNodeB 12 has established with each of one or more first UEs (e.g., from among the one or more UEs 14) a respective radio-link layer connection that encompasses just a first carrier. So when the eNodeB 12 serves each first UE, the eNodeB 12 may schedule and engage in communications with a first UE on just the first carrier. Moreover, we may also assume that the eNodeB 12 has also established with each of one or more second UEs (e.g., from among the one or more UEs 14) a respective radio-link layer connection that encompasses the same first carrier as well as one or more other carriers. So when the eNodeB 12 serves each second UE, the eNodeB 12 may schedule and engage in communications with a second UE on the first carrier and on one or more other carriers.

With regard to these second UEs, we may also assume that the eNodeB 12 has worked to configure for each second UE a respective carrier aggregation service that serves each second UE using the first carrier and one or more other carriers. In this regard, the eNodeB 12 may serve each second UE with carrier aggregation service using the same first carrier, but the eNodeB 12 may use as one or more other carriers in the carrier aggregation service for each second UE either (i) the same carrier(s) as those used by other second UEs or (ii) different carrier(s) than those used by other second UEs.

As the eNodeB 12 serves the first and second UEs, the eNodeB 12 may determine a QoS that each UE receives on each carrier. In practice, the eNodeB 12 may use various metrics to define the QoS. For example, such metrics may include throughput, packet loss, jitter, and/or voice quality, among others. With this arrangement, the eNodeB 12 may be configured to determine whether a UE is receiving threshold low QoS from the eNodeB 12 on a particular carrier, such as by determining whether the UE is receiving on the particular carrier a QoS level (e.g., a level of at least one metric) that is below a threshold level (e.g., established via manual engineering input). Other arrangements are also possible.

According to an example implementation, the eNodeB 12 may determine that each of the one or more first UEs being served on just the first carrier is receiving threshold low QoS from the eNodeB 12 on the first carrier. Once the eNodeB 12 determines that each of the one or more first UEs being served on just the first carrier is receiving threshold low QoS from the eNodeB 12 on the first carrier, the eNodeB 12 may responsively seek to increase the QoS level that each such first UE is receiving from the eNodeB 12 on the first carrier. To do so, the eNodeB 12 may responsively select one or more second UEs based on the one or more second UEs each being served by the eNodeB 12 on both the first carrier and one or more other carriers. And once the eNodeB 12 selects the one or more second UEs in this manner, the eNodeB 12 may then discontinue serving each selected second UE on the first carrier while continuing to serve each selected second UE on one or more other carrier.

As noted, the eNodeB 12 may select the one or more second UEs in this manner because the eNodeB 12 may ultimately free up some network resources on the first carrier once the eNodeB 12 discontinues the serving of each selected second UE on the first carrier. Optimally, the eNodeB 12 may then use these network resources to schedule and engage in communications with the one or more first UEs on the first carrier, which may increase the QoS level that each such first UE is receiving from the eNodeB 12 on the first carrier. Moreover, since the eNodeB 12 also serves each selected second UE with one or more other carriers, the eNodeB 12 may still continue providing service to each selected second UE on those one or more other carriers.

When selecting the one or more second UEs, the eNodeB 12 may determine in various ways whether the eNodeB 12 serves a given UE on both the first carrier and one or more other carriers. By way of example, when the eNodeB 12 establishes or reconfigures a radio-link layer connection for a UE, the eNodeB 12 may store or otherwise update a context record for the UE in order to indicate that the eNodeB 12 is serving the UE 14 on one or more particular carriers. To do so, the eNodeB 12 may, for instance, store a global identifier (e.g., Absolute Radio Frequency Channel Number (ARFCN)) of each of the one or more particular carriers. With this arrangement, the eNodeB 12 may refer to stored context records of various UEs to determine which of these UEs the eNodeB 12 serves on both the first carrier and one or more other carriers, and the eNodeB 12 may then select one or more second UEs based on these stored context records. Other examples are also possible.

In some implementations, the eNodeB 12 may specifically select the one or more second UEs based on the one or more second UEs being served by the eNodeB 12 with carrier aggregation service using the first carrier as a secondary carrier and another carrier (i.e., a carrier other than the first carrier) as a primary carrier. The eNodeB 12 may optimally make an initial selection in this manner so as to avoid having to discontinue the serving of each selected second UE on the first carrier when this first carrier is the primary carrier of each such selected second UE, or so as to otherwise avoid having to reconfigure carrier aggregation service of each selected second UE to encompass another carrier as the primary carrier for each selected UE. In such implementations, the eNodeB 12 may determine in various ways whether the eNodeB 12 serves a given UE with carrier aggregation service using the first carrier as a secondary carrier and another carrier as a primary carrier.

By way of example, when eNodeB 12 facilitates carrier aggregation service for a UE on two or more carriers, the eNodeB 12 may store or otherwise update the context record for this UE by designating one such carrier with a special primary carrier index (e.g., an index of 0) to denote this carrier as the primary carrier and by designating each other carrier with a special secondary carrier index (e.g., any of 1 to 7 are used as an index respectively to identify each secondary carrier) to denote each such other carrier as a secondary carrier. With this arrangement, the eNodeB 12 may refer to stored context records of various UEs to determine which of these UEs the eNodeB 12 serves with carrier aggregation service using the first carrier as a secondary carrier and another carrier as a primary carrier. Other examples are also possible.

In some cases, the eNodeB 12 may initially make a determination of whether the eNodeB 12 is serving at least one second UE with carrier aggregation service using the first carrier as a secondary carrier and another carrier as a primary carrier. The eNodeB 12 may do so because the eNodeB 12 may sometimes not serve any UEs with carrier aggregation service using the first carrier as a secondary carrier and another carrier as a primary carrier, yet the eNodeB 12 may still need to take actions to increase the QoS level for the first UEs as noted above. As such, if the determination is that the eNodeB 12 is serving at least one second UE in this manner, then the eNodeB 12 may responsively select the at least one second UE based on the at least one second UE being served by the eNodeB 12 with carrier aggregation service using the first carrier as a secondary carrier and another carrier as a primary carrier. Whereas, if the determination is that that the eNodeB 12 is not serving at least one second UE with carrier aggregation service in this manner, then the eNodeB 12 may responsively instead select one or more other second UEs based on the one or more other second UEs each being served by the eNodeB 12 with carrier aggregation service using the first carrier as a primary carrier and one or more other carriers as secondary carriers.

In such cases, if the eNodeB 12 ends up selecting one or more second UEs based on the one or more second UEs being served by the eNodeB 12 with carrier aggregation service using the first carrier as a primary carrier and one or more other carriers as secondary carriers, the eNodeB 12 may seek to avoid discontinuing the serving of each selected second UE on the primary carrier. To avoid discontinuing the serving in this manner, the eNodeB 12 may reconfigure respective carrier aggregation service for each selected second UE to use another carrier as the primary carrier. By way of example, the eNodeB 12 may do so by engaging in handover processing in order to transition a UE to being served by another carrier as the primary carrier or may do so in other ways. After reconfiguring respective carrier aggregation service for each selected second UE to use another carrier as the primary carrier, the eNodeB 12 may end up serving each selected second UE with carrier aggregation service using the first carrier as a secondary carrier or may end up removing the first carrier altogether from each such carrier aggregation service, among other possibilities. Regardless, once the eNodeB 12 reconfigures the carrier aggregation service in this manner, the eNodeB 12 may then discontinue the serving of each selected second UE on the first carrier.

According to various implementations, the eNodeB 12 may use various techniques to discontinue the serving of each selected second UE on the first carrier while continuing to serve each selected second UE on one or more other carriers. In one example, the eNodeB 12 may discontinue scheduling and engaging in communications with each selected second UE on the first carrier while continuing to schedule and engage in communications with each selected second UE on one or more other carriers. For instance, the eNodeB 12 may discontinue allocation of PDSCH resource blocks and/or PUSCH resource blocks on the first carrier to carry bearer traffic for each selected second UE while continuing to allocate PDSCH resource blocks and PUSCH resource blocks to carry bearer traffic on one or more other carriers for each selected second UE.

In some implementations, the eNodeB 12 may discontinue scheduling and communicating with each selected second UE on the first carrier, though the eNodeB 12 may still maintain the first carrier in the radio-link layer connection of each selected second UE. To do so, the eNodeB 12 may transmit to a UE control signaling through a control plane protocol stack that is arranged to organize data carried between the eNodeB 12 and UEs. In particular, the eNodeB 12 may transmit via this control plane protocol stack a specific control signal that includes a binary value of one ("1") to denote activation of a secondary carrier or a binary value of zero ("0") to denote deactivation of a secondary carrier. This control signal may also include a secondary carrier index to specify the secondary carrier being activated or deactivated for a specific UE and perhaps may also include an identifier of the specific UE, among other possibilities. With this approach, the eNodeB 12 may also update a context record for the specific UE to indicate activation or deactivation of certain secondary carriers, so that the eNodeB 12 can then refer to the updated context record to determine whether it is permitted to schedule and communicate with the specific UE on certain secondary carriers.

Further, activation in this manner may indicate to the specific UE that the eNodeB 12 is permitted to schedule and communicate with the specific UE on the activated secondary carrier while deactivation in this manner may indicate to the specific UE that the eNodeB 12 is no longer permitted to schedule and communicate with the specific UE on the deactivated secondary carrier, though this deactivation may still maintain the specified secondary carrier in the radio-link layer connection of the specific UE. With this technique, the eNodeB 12 can then discontinue scheduling and communicating with each selected second UE on the first carrier while maintaining the first carrier in the radio-link layer connection of each selected second UE.

In another example, the eNodeB 12 may altogether remove from the radio-link layer connection of each selected second UE the first carrier while maintaining one or more other carriers in the radio-link layer connection of each selected second UE. To do so, the eNodeB 12 and each second UE may engage in RRC configuration messaging and/or other processing to modify each second UE's radio-link layer connection to no longer include the first carrier. In particular, the eNodeB 12 may transmit to each second UE an RRC connection reconfiguration message that specifies an updated set of carriers on which the eNodeB 12 will serve a respective second UE, such as by identifying each carrier by a respective global identifier for instance. In doing so, the eNodeB may omit identification of the first carrier so that the first carrier is removed from each respective radio-link layer connection. Other examples are also possible.

In a further aspect, if discontinuing the serving of each selected second UE on the first carrier still does not solve the QoS problem for the first UEs, the eNodeB 12 may take further actions to solve the QoS problem. For example, as noted, the eNodeB 12 may optimally make an initial selection of the one or more second UEs based on the one or more second UEs being served by the eNodeB 12 with carrier aggregation service using the first carrier as a secondary carrier and another carrier as a primary carrier. In this example, after the eNodeB 12 discontinues serving each selected second UE on the first carrier, the eNodeB 12 may make a further determination that at least one of the first UEs being served on just the first carrier is still receiving threshold low quality of service from the eNodeB 12 on the first carrier.

In response to this further determination, the eNodeB 12 may take more substantial action of additionally selecting one or more second UEs based on the one or more second UEs being served by the base station with carrier aggregation service using the first carrier as a primary carrier and one or more other carriers as secondary carriers. When selecting one or more additional second UEs in this manner, the eNodeB 12 may reconfigure respective carrier aggregation service for each additionally selected second UE to use another carrier as the primary carrier and may do so in the manner discussed above or may do so in other ways. Regardless, once the eNodeB 12 selects these one or more additional second UEs, the eNodeB 12 may discontinue the serving of each additionally selected second UE on the first carrier while continuing to serve each additionally selected second UE on one or more other carriers. In this manner, the eNodeB 12 may free up further network resources on the first carrier and the eNodeB 12 may then optimally use these further network resources when serving first UEs, so as to ultimately solve the QoS problem of those first UEs.

In yet a further aspect, after the eNodeB 12 discontinues serving each selected second UE on the first carrier, the eNodeB 12 may initiate a timer that defines a duration of time for which the eNodeB 12 should discontinue serving each selected second UE on the first carrier. Once the timer expires, the eNodeB 12 may detect expiration of the time and may then responsively begin to again serve each selected second UE on both the first carrier and on one or more other carriers. By way of example, this may involve transmitting to a selected second UE via the control plane protocol stack a control signal that includes the binary value of one ("1") to denote activation (reactivation) of the first carrier and perhaps may also involve updating a context record for this selected second UE so as to denote the activation (reactivation). Other examples are also possible.

In this aspect, once the eNodeB 12 begins to again serve each selected second UE on both the first carrier and on one or more other carriers, the eNodeB 12 may determine whether each first UE is still experiencing the above-mentioned QoS problem and may responsively take actions based on whether each first UE is still experiencing a QoS problem. For example, if the eNodeB 12 determines that each of the first UEs being served on just the first carrier is no longer receiving threshold low quality of service from the eNodeB 12 on the first carrier, then the eNodeB 12 may simply resume the serving of each selected second UE on both the first carrier and on one or more other carriers. Whereas, if the eNodeB 12 determines that at least one of the first UEs being served on just the first carrier is still receiving threshold low quality of service from the eNodeB 12 on the first carrier, then the eNodeB 12 may responsively again take actions to free up network resources on the first carrier, such as in any of the ways discussed above. Other aspects are also possible.

Figure 3:
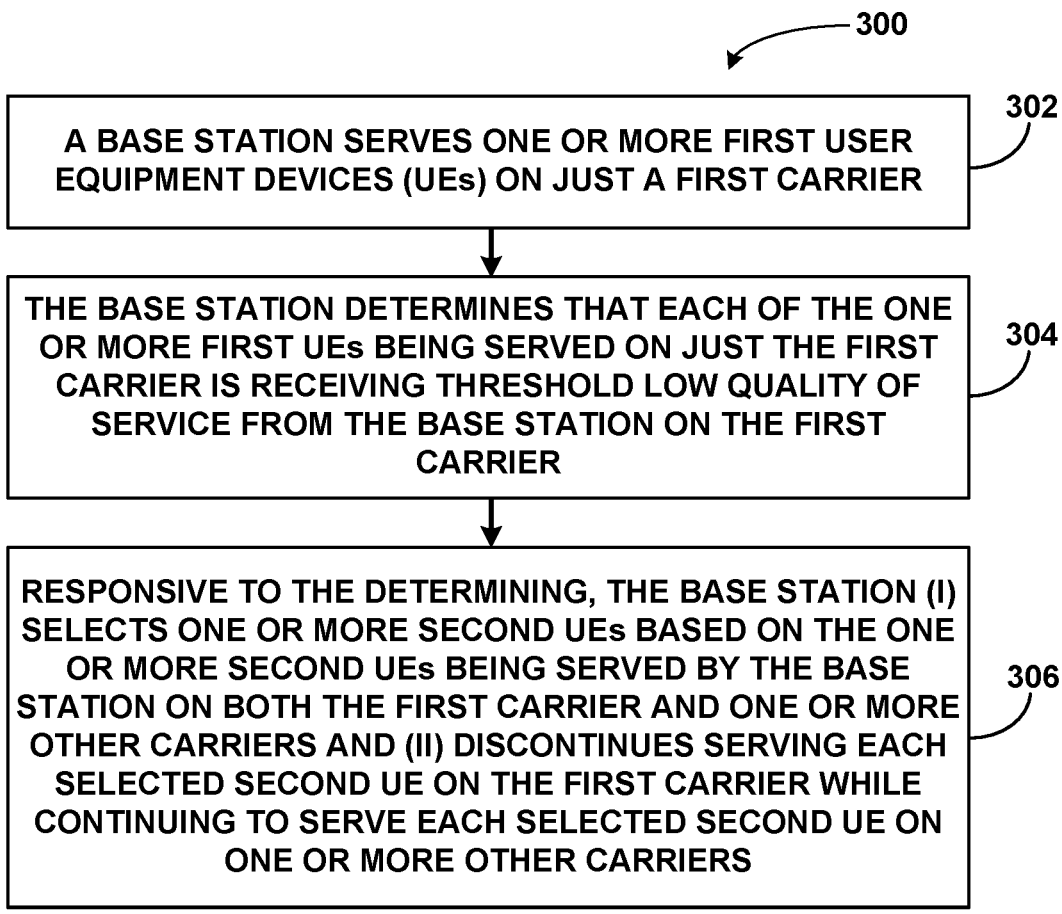
FIG. 3 is a flowchart illustrating a method to facilitate management of carriers to help ensure QOS for single-carrier UEs, in accordance with an example embodiment.

FIG. 3 is next a flowchart illustrating a method 300, which depicts an example set of operations that can be carried out by a wireless communication system in an implementation of this process. In particular, illustrative methods, such as method 300, may be carried out in whole or in part by component(s) and/or arrangement(s) in a wireless communication system, such as by the one or more of the components of the representative LTE network 10 shown in FIG. 1 and/or with one or more of the components of the base station 300 shown in FIG. 2. However, it should be understood that example methods, such as method 300, may be carried out by other entities or combinations of entities as well as in other arrangements, without departing from the scope of the disclosure.

Accordingly, as shown by block 302 in FIG. 3, method 300 involves a base station serving one or more first UEs on just a first carrier. At block 304, method 300 then involves the base station determining that each of the one or more first UEs being served on just the first carrier is receiving threshold low quality of service from the base station on the first carrier. At block 306, method 300 then involves, responsive to the determining, the base station (i) selecting one or more second UEs based on the one or more second UEs being served by the base station on both the first carrier and one or more other carriers and (ii) discontinuing serving each selected second UE on the first carrier while continuing to serve each selected second UE on one or more other carriers.

Exemplary embodiments have been described above. Those skilled in the art will understand, however, that changes and modifications may be made to these embodiments without departing from the true scope and spirit of the invention.

We claim:

1. A method comprising:
serving by a base station one or more first user equipment devices (UEs) on just a first carrier;
determining by the base station that each of the one or more first UEs being served on just the first carrier is receiving, from the base station on the first carrier, a quality of service level that is lower than a threshold quality of service level; and
responsive to the determining, (i) selecting by the base station one or more second UEs based on the one or more second UEs being served by the base station on both the first carrier and one or more other carriers and, (ii) based on the selecting, discontinuing by the base station serving each selected second UE on the first carrier while continuing to serve each selected second UE on one or more other carriers.

2. The method of claim 1, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and
wherein discontinuing serving each selected second UE on the first carrier while continuing to serve each selected second UE on one or more other carriers comprises removing from the radio-link layer connection of each selected second UE the first carrier while maintaining one or more other carriers in the radio-link layer connection of each selected second UE.

3. The method of claim 1, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and
wherein discontinuing serving each selected second UE on the first carrier while continuing to serve each selected second UE on one or more other carriers comprises discontinuing scheduling and communicating with each selected second UE on the first carrier, though maintaining the first carrier in the radio-link layer connection of each selected second UE.

4. The method of claim 1, wherein selecting by the base station one or more second UEs based on the one or more second UEs being served by the base station on both the first carrier and one or more other carriers comprises:
selecting the one or more second UEs based on the one or more second UEs being served by the base station with carrier aggregation service using (i) the first carrier as a secondary carrier and (ii) another carrier as a primary carrier.

5. The method of claim 4, further comprising:
after discontinuing by the base station serving each selected second UE on the first carrier while continuing to serve each selected second UE on one or more other carriers, making a further determination that at least one of the first UEs being served on just the first carrier is still receiving, from the base station on the first carrier, a quality of service level that is lower than the threshold quality of service level;
in response to making the further determination, (i) further selecting an additional one or more second UEs based on the selected additional one or more second UEs being served by the base station with carrier aggregation service using (a) the first carrier as a primary carrier and (b) one or more other carriers as secondary carriers and, (ii) based on the further selecting, discontinuing by the base station serving the selected additional one or more second UEs on the first carrier while continuing to serve the selected additional one or more second UEs on one or more other carriers.

6. The method of claim 5, wherein discontinuing by the base station serving the selected additional one or more second UEs on the first carrier while continuing to serve the selected additional one or more second UEs on one or more other carriers comprises:

causing the base station to serve the selected additional one or more second UEs with carrier aggregation service using another carrier as primary carrier; and after causing the base station to serve the selected additional one or more second UEs with carrier aggregation service using another carrier as primary carrier, discontinuing the serving of the selected additional one or more second UEs on the first carrier.

7. The method of claim 1, wherein the quality of service level is defined based at least in part on a metric selected from the group consisting of throughput, packet loss, jitter, and voice quality.

8. A non-transitory computer readable medium having stored thereon instructions executable by a processor to cause a base station to perform operations comprising:

serving one or more first user equipment devices (UEs) on just a first carrier;

determining that each of the one or more first UEs being served on just the first carrier is receiving, from the base station on the first carrier, a quality of service level that is lower than a threshold quality of service level; and responsive to the determining, (i) selecting one or more second UEs based on the one or more second UEs being served by the base station on both the first carrier and one or more other carriers and, (ii) based on the selecting, discontinuing serving each selected second UE on the first carrier while continuing to serve each selected second UE on one or more other carriers.

9. The non-transitory computer readable medium of claim 8, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and wherein discontinuing serving each selected second UE on the first carrier while continuing to serve each selected second UE on one or more other carriers comprises removing from the radio-link layer connection of each selected second UE the first carrier while maintaining one or more other carriers in the radio-link layer connection of each selected second UE.

10. The non-transitory computer readable medium of claim 8, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and wherein discontinuing serving each selected second UE on the first carrier while continuing to serve each selected second UE on one or more other carriers comprises discontinuing scheduling and communicating with each selected second UE on the first carrier, though maintaining the first carrier in the radio-link layer connection of each selected second UE.

11. The non-transitory computer readable medium of claim 8, wherein selecting one or more second UEs based on the one or more second UEs being served by the base station on both the first carrier and one or more other carriers comprises:

making a determination of whether the base station is serving at least one UE of the one or more second UEs with carrier aggregation service using (i) the first carrier as a secondary carrier and (ii) another carrier as a primary carrier;

if the determination is that the base station is serving at least one UE of the one or more second UEs with carrier aggregation service using (i) the first carrier as a secondary carrier and (ii) another carrier as a primary carrier, then, responsive to making the determination, selecting the at least one UE based on the at least one UE being served by the base station with carrier aggregation service using (i) the first carrier as a secondary carrier and (ii) another carrier as a primary carrier; and if the determination is that that the base station is not serving at least one UE of the one or more second UEs with carrier aggregation service using (i) the first carrier as a secondary carrier and (ii) another carrier as a primary carrier, then, responsive to making the determination, instead selecting at least one other UE of the one or more second UEs based on the at least one other UE being served by the base station with carrier aggregation service using (i) the first carrier as a primary carrier and (ii) one or more other carriers as secondary carriers.

12. The non-transitory computer readable medium of claim 11, wherein the discontinuing of serving each selected second UE on the first carrier while continuing to serve each selected second UE on one or more other carriers comprises:

if the determination is that that the base station is not serving at least one UE of the one or more second UEs with carrier aggregation service using (i) the first carrier as a secondary carrier and (ii) another carrier as a primary carrier, then, responsive to making the determination, (a) causing the base station to serve each selected second UE with carrier aggregation service using another carrier as primary carrier and (b) after causing the base station to serve each selected second UE with carrier aggregation service using another carrier as primary carrier, discontinuing the serving of each selected second UE on the first carrier.

13. The non-transitory computer readable medium of claim 8, wherein the quality of service level is defined based at least in part on a metric selected from the group consisting of throughput, packet loss, jitter, and voice quality.

14. A wireless communication system comprising:

a base station; and a controller configured to cause the base station to perform operations comprising:

serving one or more first user equipment devices (UEs) on just a first carrier frequency;

determining that each of the first UEs being served on just the first carrier frequency is receiving, from the base station on the first carrier frequency, a quality of service level that is lower than a threshold quality of service level; and responsive to the determining, (i) selecting one or more second UEs based on the one or more second UEs being served by the base station on both the first carrier frequency and one or more other carrier frequencies and, (ii) based on the selecting, discontinuing serving of each selected second UE on the first carrier frequency while continuing to serve each selected second UE on one or more other carrier frequencies.

15. The wireless communication system of claim 14, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and wherein discontinuing serving each selected second UE on the first carrier while continuing to serve each selected second UE on one or more other carriers comprises removing from the radio-link layer connection of each selected second UE the first carrier while maintaining one or more other carriers in the radio-link layer connection of each selected second UE.

16. The wireless communication system of claim 14, wherein the base station has a radio-link layer connection respectively with each first UE and with each second UE, wherein the base station's radio-link layer connection with each first UE encompasses just the first carrier, and the base station's radio-link layer connection with each second UE encompasses the first carrier and one or more other carriers, and wherein discontinuing serving each selected second UE on the first carrier while continuing to serve each selected second UE on one or more other carriers comprises discontinuing scheduling and communicating with each selected second UE on the first carrier, though maintaining the first carrier in the radio-link layer connection of each selected second UE.

17. The wireless communication system of claim 14, wherein selecting by the base station one or more second UEs based on the one or more second UEs being served by the base station on both the first carrier and one or more other carriers comprises:

selecting the one or more second UEs based on the one or more second UEs being served by the base station with carrier aggregation service using (i) the first carrier as a secondary carrier and (ii) another carrier as a primary carrier.

18. The wireless communication system of claim 14, wherein the controller is further configured to perform operations comprising:

after discontinuing serving of each selected second UE on the first carrier frequency while continuing to serve each selected second UE on one or more other carrier frequencies, initiating a timer defining a duration of time for which the base station should discontinue serving each selected second UE on the first carrier frequency;

detecting expiration of the timer; and in response to detecting expiration of the timer, causing the base station to again serve each selected second UE on both the first carrier frequency and one or more other carrier frequencies.

19. The wireless communication system of claim 18, wherein the controller is further configured to perform operations comprising:

after causing the base station to again serve each selected second UE on both the first carrier frequency and one or more other carrier frequencies, making a determination of whether each of the first UEs being served on just the first carrier frequency is still receiving, from the base station on the first carrier frequency, a quality of service level that is lower than the threshold quality of service level;

if the determination is that each of the first UEs being served on just the first carrier frequency is no longer receiving, from the base station on the first carrier frequency, a quality of service level that is lower than the threshold quality of service level, then, responsive to making the determination, resuming the serving of each selected second UEs on both the first carrier frequency and one or more other carrier frequencies; and if the determination is that at least one of the first UEs being served on just the first carrier frequency is still receiving, from the base station on the first carrier frequency, a quality of service level that is lower than the threshold quality of service level, then, responsive to making the determination, (i) additionally selecting one or more second UEs based on the one or more second UEs being served by the base station on both the first carrier frequency and one or more other carrier frequencies and, (ii) based on the selecting, discontinuing serving of each additionally selected second UE on the first carrier frequency while continuing to serve each additionally selected second UE on one or more other carrier frequencies.

20. The wireless communication system of claim 14, wherein the quality of service level is defined based at least in part on a metric selected from the group consisting of throughput, packet loss, jitter, and voice quality.

* * * * *